US009644761B2

(12) United States Patent
Childs

(10) Patent No.: US 9,644,761 B2
(45) Date of Patent: May 9, 2017

(54) DESALINATION SYSTEM WITH ENERGY RECOVERY AND RELATED PUMPS, VALVES AND CONTROLLER

(75) Inventor: Willard D. Childs, Encinitas, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 404 days.

(21) Appl. No.: 13/250,674

(22) Filed: Sep. 30, 2011

(65) Prior Publication Data
US 2013/0081724 A1 Apr. 4, 2013

(51) Int. Cl.
F17D 3/00 (2006.01)
F16K 31/363 (2006.01)
F16K 31/383 (2006.01)
C02F 1/44 (2006.01)

(52) U.S. Cl.
CPC ........... *F16K 31/363* (2013.01); *C02F 1/441* (2013.01); *F16K 31/383* (2013.01); *Y10T 137/86493* (2015.04)

(58) Field of Classification Search
CPC .............................. F16K 31/363; F16K 31/383
USPC .............................. 137/613; 251/30.01–30.05
See application file for complete search history.

(56) References Cited

U.S. PATENT DOCUMENTS

| 2,528,131 A | 10/1950 | Garretson |
| 2,775,982 A | 1/1957 | Canfield |
| 2,915,042 A * | 12/1959 | Shafer ........................... 137/100 |
| 3,022,738 A | 2/1962 | Archie |
| 3,135,293 A | 6/1964 | Hulsey |
| 3,374,746 A | 3/1968 | Chenault |
| 3,685,536 A | 8/1972 | Bake et al. |
| 3,762,435 A * | 10/1973 | Auwerter ................. 137/505.22 |
| 3,794,292 A * | 2/1974 | Jaegtnes ........................ 251/31 |
| 3,825,122 A | 7/1974 | Taylor |

(Continued)

FOREIGN PATENT DOCUMENTS

| CA | 2657567 A1 | 3/2008 |
| CH | 586364 A5 | 3/1977 |

(Continued)

OTHER PUBLICATIONS

Childs, Willard D. and Ali Dabiri, VARI-RO™ Desalting Pilot Plant Testing and Evaluation, Final Technical Report, Science Applications International Corporation; San Diego CA; Water Treatment Technology Program; US Department of the Interior, Bureau of Reclamation, Untied States of America; May 1998.

(Continued)

*Primary Examiner* — Michael R Reid
*Assistant Examiner* — Christopher Ballman

(57) ABSTRACT

A fluid pumping system with energy recovery features may be used to provide feed water to a reverse osmosis unit. The system includes an electronic controller unit that regulates the output of three hydraulic pumps. Each hydraulic pump drives the movement of a piston in a cylinder. The pistons collectively deliver a generally constant flow of high pressure feed water to the reverse osmosis unit. Concentrate valve bodies direct concentrate from the reverse osmosis unit to the back sides of the pistons to reduce the work required from the hydraulic pumps. The concentrate valve bodies are designed to open and close based upon the flow of concentrate through the valve bodies. The piston and cylinder are designed for exposure to sea water and RO brine.

4 Claims, 2 Drawing Sheets

(56) References Cited

U.S. PATENT DOCUMENTS

| | | | |
|---|---|---|---|
| 3,833,200 A * | 9/1974 | McCombs, Jr. | F16K 31/383 251/25 |
| 3,941,154 A | 3/1976 | Bishop | |
| 3,977,434 A | 8/1976 | Albright et al. | |
| 4,009,860 A * | 3/1977 | Lingnau | F16K 31/383 251/251 |
| 4,016,083 A | 4/1977 | Sakaguchi et al. | |
| 4,145,884 A | 3/1979 | Childs | |
| 4,285,365 A | 8/1981 | Coats et al. | |
| 4,434,056 A | 2/1984 | Keefer | |
| 4,450,863 A * | 5/1984 | Brown | 137/613 |
| 4,459,952 A | 7/1984 | Holstein | |
| 4,526,340 A * | 7/1985 | Kolchinsky | F16K 31/408 251/38 |
| 4,574,840 A | 3/1986 | Schumann et al. | |
| 4,644,969 A | 2/1987 | Watanabe | |
| 4,697,619 A * | 10/1987 | Tiefenthaler | 137/613 |
| 4,705,627 A | 11/1987 | Miwa et al. | |
| 4,724,866 A | 2/1988 | Bates et al. | |
| 4,838,145 A | 6/1989 | Slocum et al. | |
| 4,913,809 A | 4/1990 | Sawada et al. | |
| 5,154,820 A | 10/1992 | Solomon | |
| 5,222,873 A | 6/1993 | Whitehead et al. | |
| 5,339,857 A * | 8/1994 | Scallan | F16K 31/383 251/38 |
| 5,350,047 A | 9/1994 | Kimura et al. | |
| 5,476,222 A | 12/1995 | Singer et al. | |
| 5,542,384 A * | 8/1996 | Rosenmann | F16K 31/383 123/179.31 |
| 5,628,198 A | 5/1997 | Permar | |
| 5,634,779 A | 6/1997 | Eysymontt | |
| 5,645,263 A | 7/1997 | Aardema | |
| 5,967,108 A | 10/1999 | Kutlucinar | |
| 6,017,200 A | 1/2000 | Childs et al. | |
| 6,135,724 A | 10/2000 | Yoder et al. | |
| 6,205,780 B1 | 3/2001 | Zervas | |
| 6,244,838 B1 | 6/2001 | Couillard et al. | |
| 6,263,905 B1 * | 7/2001 | Yokota et al. | 137/413 |
| 6,266,598 B1 | 7/2001 | Pillar et al. | |
| 6,267,571 B1 | 7/2001 | Anderson et al. | |
| 6,468,831 B2 | 10/2002 | Leong et al. | |
| 6,470,683 B1 | 10/2002 | Childs et al. | |
| 6,491,813 B2 | 12/2002 | Verde | |
| 6,623,254 B2 | 9/2003 | Chowaniec et al. | |
| 6,652,741 B1 | 11/2003 | Marinzet | |
| 6,708,489 B2 | 3/2004 | Massey et al. | |
| 6,773,226 B2 | 8/2004 | Al-Hawaj | |
| 6,841,076 B1 | 1/2005 | Wobben | |
| 7,000,379 B2 | 2/2006 | Makki et al. | |
| 7,032,388 B2 | 4/2006 | Healy | |
| 7,152,620 B2 | 12/2006 | Baumgarten et al. | |
| 7,168,927 B2 | 1/2007 | Brueckmann et al. | |
| 7,415,937 B2 | 8/2008 | Giesler et al. | |
| 7,540,230 B2 | 6/2009 | Rojanskiy et al. | |
| 7,634,911 B2 | 12/2009 | Brinkman | |
| 7,753,072 B2 | 7/2010 | Douglas et al. | |
| 7,757,714 B2 | 7/2010 | Meinhof | |
| 7,905,088 B2 | 3/2011 | Stephenson et al. | |
| 7,927,082 B2 | 4/2011 | Haudenschild | |
| 8,186,154 B2 | 5/2012 | Nelson et al. | |
| 9,119,676 B2 | 9/2015 | Daly et al. | |
| 2001/0017278 A1 | 8/2001 | Verde | |
| 2002/0000648 A1 | 1/2002 | Leong et al. | |
| 2002/0134441 A1* | 9/2002 | Kusumoto et al. | 137/625.3 |
| 2003/0024239 A1 | 2/2003 | Massey et al. | |
| 2003/0116122 A1* | 6/2003 | Haeberer et al. | 123/295 |
| 2003/0118459 A1 | 6/2003 | Gerhardt et al. | |
| 2005/0062000 A1* | 3/2005 | Bartell et al. | 251/82 |
| 2005/0123416 A1 | 6/2005 | Smith | |
| 2006/0071189 A1* | 4/2006 | Cornwell et al. | 251/55 |
| 2007/0045069 A1 | 3/2007 | Schedgick et al. | |
| 2007/0128056 A1 | 6/2007 | Haudenschild | |
| 2007/0246678 A1 | 10/2007 | Michaels | |
| 2010/0063494 A1 | 3/2010 | Orszulak | |
| 2010/0154401 A1 | 6/2010 | Sullivan, Jr. et al. | |
| 2010/0301252 A1 | 12/2010 | Myran et al. | |
| 2011/0017310 A1* | 1/2011 | Eriksson | E02F 9/2203 137/14 |
| 2011/0077783 A1 | 3/2011 | Karpman et al. | |
| 2011/0198290 A1 | 8/2011 | Oklejas | |
| 2012/0067432 A1 | 3/2012 | Vigholm et al. | |
| 2012/0118810 A1 | 5/2012 | Giles et al. | |
| 2014/0154099 A1 | 6/2014 | Sivaramakrishnan et al. | |

FOREIGN PATENT DOCUMENTS

| | | |
|---|---|---|
| CN | 2716251 Y | 8/2005 |
| CN | 1721047 A | 1/2006 |
| CN | 2926197 Y | 7/2007 |
| DE | 2444740 A1 | 4/1976 |
| DE | 102007033498 A1 | 1/2009 |
| DE | 102008011982 A1 | 9/2009 |
| EP | 0292267 A2 | 11/1988 |
| GB | 2356432 A | 5/2001 |
| JP | 2005195081 A | 7/2005 |
| JP | 2010063976 A | 3/2010 |
| WO | 91/19676 A1 | 12/1991 |
| WO | 03051598 A1 | 6/2003 |
| WO | 20071146321 A1 | 12/2007 |
| WO | 2009151174 A1 | 12/2009 |
| WO | 2010030723 A1 | 3/2010 |
| WO | 2012085326 A1 | 6/2012 |

OTHER PUBLICATIONS

Denison Hydraulics, GoldCup Digital HI-IQ Control, Electronic Control Card User Manual Software Version 2.2b, Jun. 4, 2002.

Search Report and Written Opinion from corresponding PCT Application No. PCT/US2012/057813 dated Jan. 4, 2013.

Childs, Willard D. et al., Energy and Capital Cost Savings With a Highly Efficient Integrated Pumping and Energy Recovery System, IDA World Congress—Atlantis, The Palm—Dubai, UAE, Nov. 7-12, 2009.

Search Report and Written Opinion from PCT Application No. PCT/US2012/055695 dated Dec. 12, 2012.

Sanz, Miguel Angel, Energy as Motor of Seawater Reverse Osmosis Desalination Development, WISA Membrane Technology Conference 2011, Sep. 11-14, 2011, Umhlanga, South Africa.

Bross, Stephan et al., SWRO core hydraulic system: Extension of the SalTec DT to higher flows and lower energy consumption, Desalination 203 (2007) 160-167.

Fluid Power Lecture Notes, accessed at http://paws.wcu.edu/ballaaron/www/met441/notes/notes.html on Jul. 3, 2013, Figures 4 and 5, p. 9.

Unofficial English Translation of Chinese Office Action issued in connection with corresponding CN Application No. 201280047732.5 on Mar. 26, 2015.

International Search Report and Written Opinion issued in connection with corresponding PCT Application No. PCT/US2013/071381 on Mar. 17, 2014.

US Office Action dated Jan. 22, 2015 issued in connection with corresponding U.S. Appl. No. 13/250,463.

US Office Action dated Jun. 2, 2015 issued in connection with corresponding U.S. Appl. No. 13/250,463.

International Search Report and Written Opinion dated Mar. 17, 2014 issued against related PCT application No. PCT/US2013/071834.

Office Action dated Dec. 3, 2015, issued against related U.S. Appl. No. 13/693,762.

Office Action dated Dec. 18, 2015, issued against related U.S. Appl. No. 13/693,743.

Childs et al., "VARI-RO Direct Drive Engine Study", Science Applications International Corporation, pp. 1-54, 1998.

Stover, "Energy Recovery Devices for Seawater Reverse Osmosis", Everything About Water, pp. 40-46, 2006.

Sun et al., "Energy Recovery Device with a Fluid Switcher for Seawater Reverse Osmosis System", Chinese Journal of Chemical Engineering, vol. 16, Issue 2, pp. 329-332, 2008.

(56) References Cited

OTHER PUBLICATIONS

Contreras, "An Energy Recovery Device for Small-Scale Seawater Reverse Osmosis Desalination", A Doctoral Thesis, Submitted in partial Fulfilment of the Requirements, for the Award of Doctor of Philosophy of Loughborough University, pp. 1-146, Dec. 9, 2009.
"GE Introduces Major Energy Efficiency Breakthrough for Desalination Plants", General Electrical, 2012.
PCT Search Report and Written Opinion issued in connection with related PCT Application No. PCT/US2013/071829 on Mar. 17, 2014.
Unofficial English translation of Chinese Office Action issued in connection with related CN Application No. 201280047713.2 on Feb. 9, 2015.
Final Office Action issued in connection with related U.S. Appl. No. 13/693,743 on Aug. 25, 2015.
US Final Office Action issued in connection with Related U.S. Appl. No. 13/693,743 on Jun. 28, 2016.

* cited by examiner

DESALINATION SYSTEM WITH ENERGY RECOVERY AND RELATED PUMPS, VALVES AND CONTROLLER

This invention was made with government support under Assistance Agreement No. 1425-5-FC-81-20410 awarded by the U.S. Department of the Interior, Bureau of Reclamation.

FIELD

The present disclosure relates generally to a valve system for recovering energy from pressurized fluids.

BACKGROUND

Many areas of the world do not have adequate fresh water supplies, but they are able to obtain seawater. Seawater can be desalinated using reverse osmosis, among other processes. To desalinate seawater by reverse osmosis (RO), the feed water must be pressurized above the osmotic pressure of the feed water. The feed water becomes concentrated during the process, and its osmotic pressure increases. Typical feed water pressures for seawater reverse osmosis (SWRO) are in the range of 50-70 bar.

Given the high feed water pressures, energy costs (typically in the form of electrical consumption) are the largest component of the operating cost of a SWRO plant. Through various improvements, the amount of energy used per unit of water produced by SWRO has decreased over time. For example, high pressure multi-stage turbine pumps have become more efficient, to about 70% nominal efficiency. Power recovery turbines are now used to recover some of the energy in the concentrated brine flow leaving the RO modules. Recovery rates have been optimized to balance the cost of pre-treating and pumping feed water (which decreases with increased recovery rate) with the cost of producing desalinated water (which increases with increased recovery rate). Despite these improvements, however, energy costs are still a significant portion of the cost of desalinated water.

Energy consumption also interferes with adopting advances in RO membrane technology. Advances in RO membrane technology have included membrane elements that are capable of operating above 70 bar, and with recovery rates of 55% or more. In theory, a higher recovery rate should allow for decreased capital costs and decreased raw feed water flow. Decreasing the flow of raw feed water would in turn produce savings in pre-treatment and feed water pumping, and reduce the environmental damage caused by withdrawing seawater. However, as mentioned above, when the feed water is concentrated its osmotic pressure increases. As recovery rate increases, so does the feed water concentration, osmotic pressure and energy consumption. The key to breaking this cycle is to recovery more of the energy imbedded in the brine leaving the RO modules. The pressure of the brine also increases with osmotic pressure. Accordingly, there is more energy embedded in the brine of a high recovery process. If a greater percentage of this embedded energy can be recovered, there will be a direct reduction in energy consumption, as well as the possibility of further reductions due to an increase in the optimal recovery rate.

Despite incremental improvements over time, turbine based pumps and energy recovery devices are limited in their energy efficiency. Turbine based technologies are used because they are familiar and easy to use to produce constant flow rates and pressures through the SWRO plant. Adopting a different approach, Childs et al. described a piston based pumping and energy recovery system in U.S. Pat. No. 6,017,200, entitled Integrated Pumping and/or Energy Recovery System. This system uses a piston driven by a hydraulic pump to provide pressurized feed water to an RO membrane module. The front face of the piston drives the feed water to the RO module. The back face of the piston receives brine from the RO module. The pressure of the brine acting on the back face of the piston reduces the power required from the hydraulic pump to move the piston.

In the Childs et al. system, "energy recovery" valves admit brine to the back face of the piston on a forward stroke. Additional discharge valves allow the admitted brine to leave the piston on a backward stroke. The energy recovery and discharge valves are controlled by a control unit that also operates the hydraulic pump. The control unit synchronizes the movements of the valves with the movement of the piston. Because the piston reciprocates, it must accelerate and decelerate and therefore inherently produces an uneven rate of flow and pressure of the feed water. However, when a set of pistons are used, their output may be synchronized to produce a fluctuating, but nearly constant, combined out pressure. Although subject to various practical difficulties, the Childs et al. system has the potential to efficiently produce a high pressure flow of feed water.

SUMMARY OF THE INVENTION

The present disclosure describes a valve system to provide a flow of pressurized fluid. The valve system may be used with a pumping system and process, for example, to provide feed water to a reverse osmosis (RO) system and recover energy from the brine leaving the RO system. The system and process have a set of piston based pumps, valves to return brine to the pumps, and an electronic controller for operating the pumps and valves. The system and process are generally similar to the Childs et al. system described above.

The energy recovery and discharge valves described in U.S. Pat. No. 6,017,200 were moved between open and closed states by a solenoid that was in turn operated by the control unit. In the apparatus described herein, valves are used which respond to variations in the rate of flow through them. In particular, the valves move towards a closed position when the rate of flow through them decreases.

Mechanically, the present valve system has a piston that closes against a downstream seat inside of a valve body. The face of the piston has two effective surface areas, for example a central area and an outer ring. Water flowing through the valve passes around the piston. The outer ring is located upstream of the valve seat which creates a bend in the flow path of the valve body that causes a head loss to flowing water. Because of this head loss, and the displacement of the outer ring upstream of at least part of the head loss, when water is flowing though the valve the static pressure on the central area of the piston is less than the static pressure on the outer ring. The back of the piston is connected to the downstream static pressure. Accordingly, when water is flowing through the valve, the piston is pushed towards an open position by a force that increases with the flow rate of the water. A spring may be used to bias the piston towards the closed position. At high flow rates, the additional pressure on the outer ring, relative to the downstream pressure in the valve body, overcomes the spring and keeps the valve open. However, as the flow rate decreases, the additional pressure on the outer ring decreases and the valve is able to move towards a closed position. A pilot valve is used to selectively connect the back of the piston in fluid communication with either upstream or down stream of the piston.

DETAILED DESCRIPTION

Figure 1:
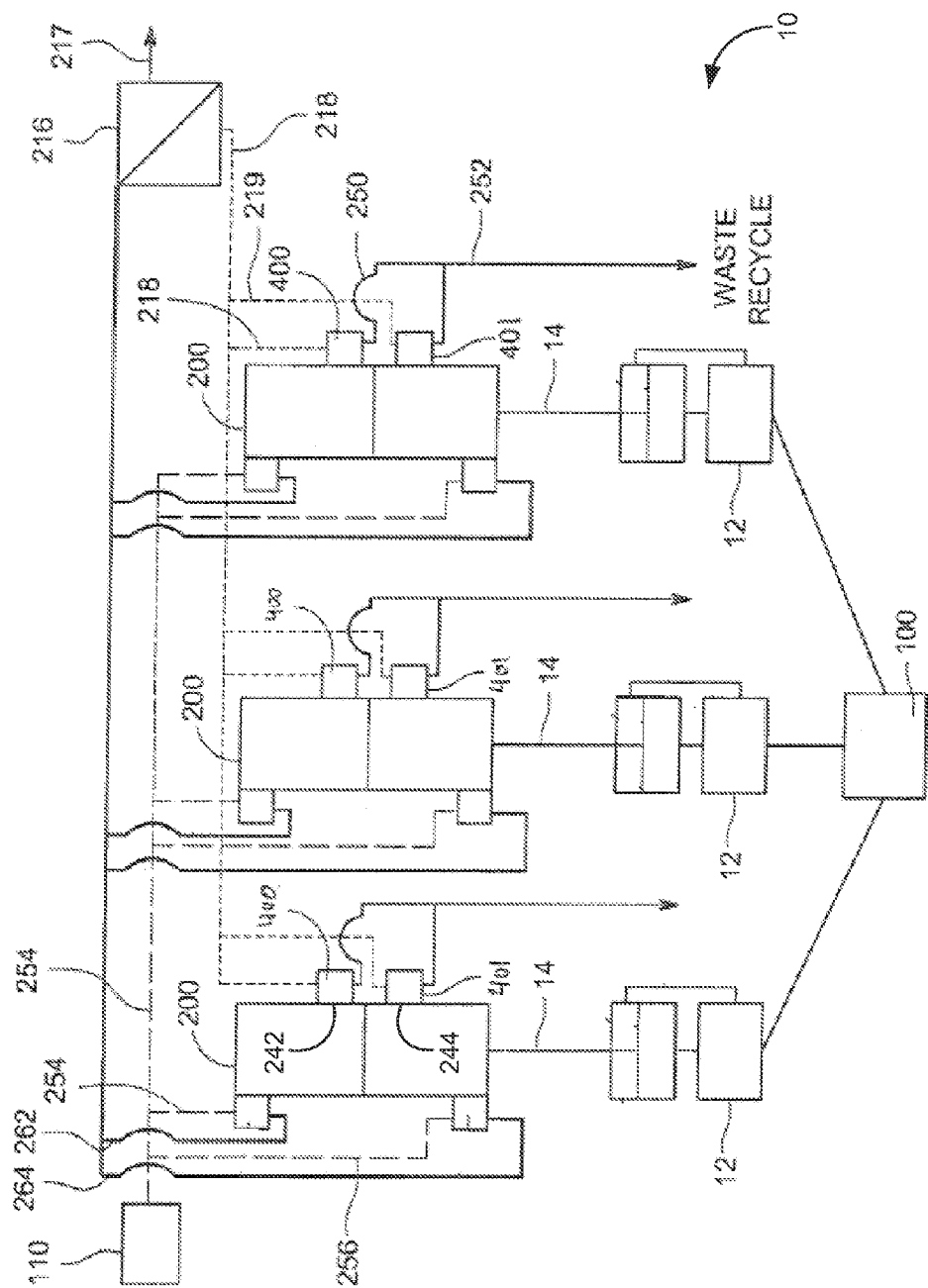
FIG. 1 is a schematic drawing of a fluid pumping and energy recovery system in combination with a reverse osmosis system.

As depicted in FIG. 1, a system 10 includes a source of feed water 110, three hydraulic pumps 12, a water cylinder 200 for each hydraulic pump 12, an RO membrane unit 216, and a control unit 100. The system 10 is similar to the system described in U.S. Pat. No. 6,017,200, which is incorporated by reference, but will also be described below.

Under instruction from the control unit 100, each hydraulic pump 12 controls the movement of an individual piston rod 14. The piston rod 14 is mechanically coupled to two, dual-action pistons (not shown in FIG. 1), that are housed within a water cylinder 200. As will be further described below, the hydraulic output of each hydraulic pump 12 causes the piston rod 14 to move. Due to the mechanical coupling, the movement of the piston rod 14 causes the two, dual-action pistons to move in unison with the movement of the piston rod 14. The piston rod 14 and the two-dual action pistons may collectively be referred to as a reciprocating assembly. For clarity, this disclosure will describe the features of a single pump and reciprocating assembly, but it is understood that this similarly describes the features of all the hydraulic pumps and reciprocating assemblies in the system.

A source of feed water 110, which includes sources of sea water, brackish water and the like, is connected to and supplies feed water to the water cylinder 200 by feed water supply lines 254, 256 (indicated as the long dashed line in FIG. 1).

The system 10 also includes high pressure feed water supply lines 262, 264 to direct a high pressure feed water from the water cylinder 200 to the RO membrane unit 216 (indicated as the thick solid line in FIG. 1).

The RO membrane unit 216 produces a volume of permeate, that is desalted water, which is directed by the permeate line 217 for the desired uses of the desalinated filtrate product. The RO membrane unit 216 also produces a volume of high pressure concentrate. The high pressure concentrate is directed from the RO membrane unit 216 by lines 218, 219 back to the water cylinder 200 (indicated as the dotted lines in FIG. 1).

The water cylinders 200 also include a low pressure concentrate outlet, as described further below, that is connected to low pressure concentrate discharge lines 250, 252 which direct the low pressure concentrate to a waste stream or recycle stream depending upon the particulars of the overall system (indicated as the thin solid line in FIG. 1).

From a general perspective, there are four distinct hydrostatic pressures within this system. The first pressure P1 is the pressure that supplies the feed water from the source 110, through lines 254, 256 to the water cylinder 200. P1 can be provided by a variety of known pumps. The second pressure P2, which is substantially higher than P1, is the pressure exerted on the feed water from the water cylinder 200, through lines 262, 264, to the RO membrane unit 216. As described below, P2 is provided by the dual-action pistons 224, 226 of the water cylinder 200. The third pressure P3, is the hydrostatic pressure of the concentrate fluid as it leaves the RO membrane unit 216 to return to the water cylinder 200, via lines 218, 219. P3 is slightly less than P2 because some of the energy is used to drive the desalinated water out of the RO membrane unit 216, into permeate line 217. The fourth pressure P4 is the pressure of the concentrate as it leaves the water cylinder 200 via lines 250, 252 to the waste or recycling stream. P4 is less than P3.

For example, P1 is substantially in the range of 5 to 100 p.s.i.; P2 is in the range of 600 to 1000 p.s.i.; P3 is in the range of 500 to 950 p.s.i.; and P4 is 1 to 50 p.s.i.

As shown in FIG. 1, the water cylinder 200 also includes two concentrate valve bodies 400, 401, alternatively called energy recovery valves. The concentrate valve bodies 400, 401 are positioned between lines 218, 219, and the concentrate access ports 242, 244 (see FIG. 1). The specific features and functions of the concentrate valve bodies 400 and 401 are the same, with the exception of the specific connections between the concentrate working chamber and the high pressure concentrate lines 218,219. Therefore the present disclosure will describe the concentrate valve body 400 and it is understood that this described is inclusive of the concentrate valve body 401.

Figure 2:
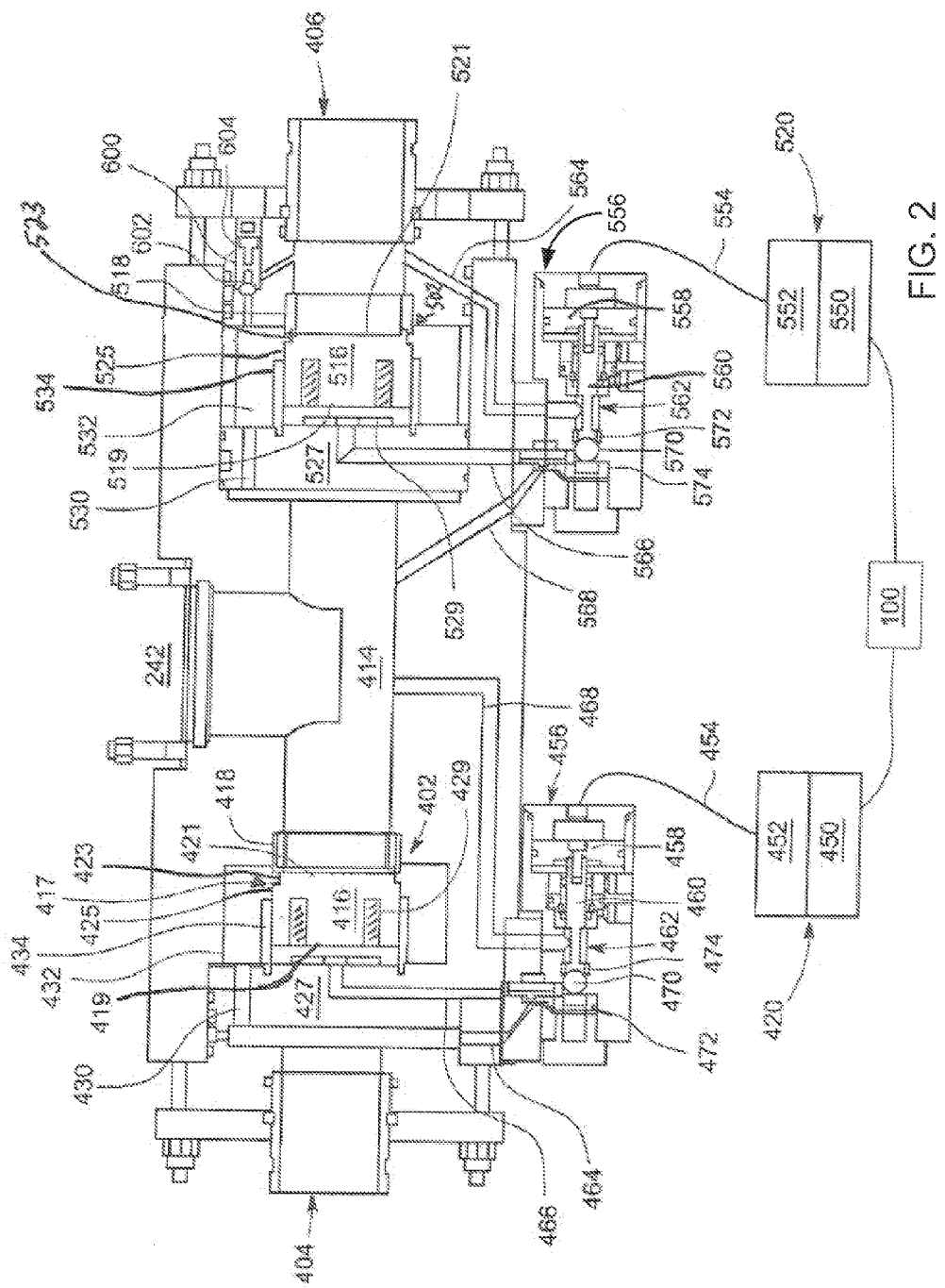
FIG. 2 is a cross-sectional, schematic view of an energy recovery valve, alternatively called a concentrate valve, used in the system of FIG. 1.

As shown in FIG. 2, the concentrate valve body 400 includes concentrate flow control valves 402, 502 to control the flow of concentrate into and out of concentrate access port 242. The concentrate valve body 400 has a first end 404, also referred to as the high pressure input end, that is in fluid communication with the high pressure concentrate line 218. The concentrate valve body 400 also has a second end 406, also referred to as the low pressure output end, that is in fluid communication with the low pressure discharge line 250. Between the two ends there is a central chamber 414 that is in fluid communication with the concentrate access port 242.

The concentrate valve body 400, includes concentrate flow control valves 402, 502. The concentrate control valves 402, 502 are also referred to as the inlet valve 402 and the outlet valve 502. The inlet valve 402 is positioned between the first end 404 and the central chamber 414 of the concentrate valve body 400. The outlet valve 502 is located between the central chamber 414 and the second end 406.

The inlet valve 402 includes a manifold plate 427, an inlet valve seat 418 and an inlet valve piston 416. The manifold plate 427 is positioned between the first end 404 and the central chamber 414. The manifold plate 427 extends across the inner surface of the concentrate valve body 400 and includes a high pressure port 430 to provide fluid communication between the first end 404 and a high pressure chamber 432. The high pressure chamber 432 is located between the manifold plate 427 and the inlet valve seat 418. The inlet valve seat 418 is located between the manifold plate 427 and the central chamber 414. The inlet valve seat 418 includes a central aperture or a series of apertures so that when the inlet valve piston 416 is displaced from the inlet valve set 418, as further described below, fluid may flow from the high pressure chamber 432, past the inlet valve seat 418 into the central chamber 414.

The inlet valve piston 416 is located between the manifold plate 427 and the inlet valve seat 418. The inlet valve piston 416 has a first surface 419 that faces towards the manifold plate 427, also referred to as the back of the inlet valve piston. The inlet valve piston also include a second surface 421 that faces towards the inlet valve seat 418, also referred to as the front of the inlet valve piston. The second surface 421 includes a stepped region 417 that establishes two effective surface areas, a central area 423 and an outer ring 425. When the second surface 421 is seated in the inlet valve seat 418, as described further below, the central area 423 is in direct contact with the inlet valve seat 418 and the outer ring 425 is recessed from the inlet valve seat 418.

The manifold plate 427 includes a manifold plate extension 434 that restricts the movement of the inlet valve piston 416 to actuate in a single plane, between an open position and a closed position. The manifold plate extension 434 extends away from the manifold plate 427, towards the central chamber 414 forming a plenum between the manifold plate 427, the manifold plate extension 434 and the first surface 419. The manifold plate extension 434 extends around the inlet valve piston 416, thereby restricting the movement of the inlet valve piston 416 to move either towards or away from the manifold plate 427 and thereby towards or away from the inlet valve seat 418.

The high pressure chamber 432 is defined by the inner surface of the concentrate valve body 400, the manifold plate 427, the manifold plate extension 434 and at least partially by the inlet valve piston 416, as will be discussed further below. Via the high pressure port 430, the manifold plate 427 isolates the first surface 419 of the inlet valve piston 416 from the high pressure concentrate fluid flow that enters the concentrate valve body 400 from the first end 404.

Optionally, an inlet spring 429, for example an extension spring, can be positioned between and in contact with the manifold plate 427 and the first surface 419 of the inlet valve piston 416. The inlet spring 429 provides a physical biasing force that directs the inlet valve piston 416 towards the inlet valve seat 418.

The inlet valve piston 416 is moveable, within the confines of the manifold plate extension 434, to position the second surface 421 of the inlet valve piston 416 in direct contact with the inlet seat 418, this is referred to as the closed position. When the inlet valve 402 is in the closed position, there is no fluid communication between the inlet valve piston 416 and the inlet valve seat 418 and therefore there is no fluid communication between the first end 404 and the central chamber 414. Further, when the inlet valve piston 416 is in the closed position it contributes to defining the high pressure chamber 432 (as shown in FIG. 2). When the inlet valve piston 416 is in the closed position, the inlet fluid path between the first end 404 and the central chamber 414 terminates in the high pressure chamber 432.

The inlet valve piston 416 is also moveable to position the second surface 421 away from the inlet seat 418, this is referred to as the open position. When the inlet valve piston 416 is in the open position, the inlet fluid flow path is open between the inlet valve piston 416 and the inlet valve seat 418. This inlet fluid flow path provides fluid communication from the first end 404 to the central chamber 414 and ultimately into the concentrate working chamber of the water cylinder 200. When the inlet valve piston 416 is in the open position it contributes only partially to defining the high pressure chamber 432 because the inlet fluid path is open between the inlet valve piston 416 and the inlet valve seat 418. When the inlet valve piston 416 is in the open position, an inlet fluid path between the first end 404 and the central chamber passes through the high pressure chamber 432.

The inlet valve 402 includes an inlet valve actuator 420 that responds to instructions from the control unit 100. Instructions from the control unit 100 cause the inlet valve piston 416 to actuate between the open position and the closed position.

The inlet valve actuator 420 includes a solenoid 450 that responds to electrical signals from the control unit 100. Based upon the electrical signals received from the control unit 100, the solenoid 450 can activate thereby connecting an air compressor 452 to an air line 454. The air line 454 is connected to one end of a pilot valve body 456. The solenoid 450 can also de-activate thereby connecting the air line 454 to a vent port (not shown) of the solenoid valve 450. The pilot valve body 456 includes a pilot valve piston 458, which has one piston face that faces the pressurized air line 454. The pilot valve piston 458 also has an opposite piston face that is connected to a pilot valve stem 460. The pilot valve stem 460 extends away from the pilot valve piston 458. The pilot valve stem 460 extends away from the pilot valve piston 458 through a pilot valve chamber 462. The pilot valve stem 460 can move within the pilot valve chamber 462 without creating any pressure or fluid seals therein.

Three separate channels branch off of the pilot valve chamber 462: a first pilot chamber 464; a second pilot chamber 466; and a third pilot chamber 468. The first pilot chamber 464 is connected to the first end 404 to provide fluid communication between the first end 404 and the pilot valve chamber 462. The second pilot chamber 466 is connected between the pilot valve chamber 462 and the first surface 419 of the inlet valve piston 416. The second pilot chamber 466 can extend through the manifold plate 427 to provide fluid communication between the first surface 419 of the inlet valve piston 416 and the pilot valve chamber 462. The third pilot chamber 468 is connected between the pilot valve chamber 462 and the central chamber 414, providing fluid communication therebetween.

The pilot valve chamber 462 also includes a pilot ball valve 470, an inlet pilot ball valve seat 472 and an outlet ball valve seat 474. The pilot ball valve 470 can move between an inlet position and an outlet position. When the pilot ball valve 470 is seated in the inlet pilot ball valve seat 472, this is referred to as the inlet position. When the pilot ball valve 470 is seated in the outlet pilot ball valve seat 474, this is referred to as the outlet position. In FIG. 2, the pilot ball valve 470 is shown in the outlet position.

When the pilot ball valve 470 is in the inlet position, there is no fluid communication between the first pilot chamber 464 and the second pilot chamber 466. When the pilot ball valve 470 is in the inlet position there is fluid communication between the second pilot chamber 466 and the third pilot chamber 468.

When the pilot ball valve 470 is in the outlet position, there is fluid communication between the first pilot chamber 464 and the second pilot chamber 466. When the pilot ball valve 470 is in the outlet position, a fluid path is opened from the first end 404, through the first pilot chamber 464 the second pilot chamber 466 to the first surface 419 of the inlet valve piston 416. Pressurized concentrate that follows this fluid path causes the inlet valve piston 416 to move into direct contact with the inlet valve seat 418, the closed position.

The outlet valve 502 is located within the concentrate valve body 400, between the second end 406 and the central chamber 414. The outlet valve 502 includes a manifold plate 527, an outlet valve seat 518 and an outlet valve piston 516. The manifold plate 527 is positioned between the second end 406 and the central chamber 414. The manifold plate 527 extends across the inner surface of the concentrate valve body 400 and includes a flow port 530 that provides fluid communication between the central chamber 414 and a pressure chamber 532. The pressure chamber 532 is located between the manifold plate 527 and the outlet valve seat

518. The outlet valve seat 518 is located between the manifold plate 527 and the second end 406. The outlet valve seat 518 is smaller in cross-section than the outlet valve piston 516. The outlet valve seat 518 includes a central aperture or a series of apertures so that when the outlet valve piston 516 is displaced from the outlet valve set 518, as further described below, fluid may flow from the high pressure chamber 532, past the outlet valve seat 518 towards the second end 406.

The outlet valve piston 516 is located between the manifold plate 527 and the outlet valve seat 518. The outlet valve piston 516 has a first surface 519 that faces towards the manifold plate 527, also referred to as the back of the outlet valve piston. The outlet valve piston also includes a second surface 521 that faces towards the outlet valve seat 518, also referred to as the front of the outlet valve piston 516. When the second surface 521 is seated in the outlet valve seat 518, as described further below, the central area 523 is in direct contact with the outlet valve seat 518 and the outer ring 525 is recessed from the outlet valve seat 518.

The movement of the outlet valve piston 516 is restricted by a manifold plate extension 534 to actuation in a single plane, between an open position and a closed position. The manifold plate extension 534 extends away from the manifold plate 534, towards the second end 406 and the manifold plate extension 534 extends around the outlet valve piston 516. The manifold plate extension 534 forms a plenum between the manifold plate 527 and the first surface 519. The manifold plate extension 534 restricts the movement of the outlet valve piston 516 to move either towards or away from the manifold plate 527 and thereby towards or away from the outlet valve seat 518.

The pressure chamber 532 is defined by the inner surface of the concentrate valve body 400, the manifold plate 527, the manifold plate extension 534 and at least partially by the outlet valve piston 516, as will be discussed further below. The manifold plate 527 can isolate the first surface 519 of the outlet valve piston 516 from the concentrate fluid flow within the central chamber 414.

Optionally, an outlet spring 529, for example a cylindrical compression spring, may be placed in contact with the manifold plate 527 and the first surface 521 of the outlet valve piston 516. The outlet spring 529 provides a physical biasing force that drives the outlet valve piston 516 towards the outlet valve seat 518.

The outlet valve piston 516 is moveable, within the confines of the manifold plate extension 534 to position the second surface 521 of the outlet valve piston 516 in direct contact with the outlet seat 518, this is referred to as the closed position. When the outlet valve 502 is in the closed position, there is no fluid communication between the outlet valve piston 516 and the outlet valve seat 518. When the outlet piston 516 is in the closed position there is no fluid communication between the central chamber 414 and the second end 406. When the outlet valve piston 516 is in the closed position it contributes to defining the pressure chamber 532 (as shown in FIG. 2). Therefore, when the outlet valve piston 516 is in the closed position, an outlet fluid path between the central chamber 414 and the second end 406 terminates in the pressure chamber 532.

The outlet valve piston 516 is moveable to position the second surface 521 away from the outlet seat 518, this is referred to as the open position. When the outlet valve piston 516 is in the open position, the outlet fluid flow path is established between the outlet valve piston 516 and the outlet valve seat 518. This outlet fluid flow path provides fluid communication from the central chamber 414 to the second end 406 and ultimately to line 250 for waste or recycling. When the outlet valve piston 516 is in the open position it partially contributes to defining the pressure chamber 532 because the outlet fluid path is now open between the outlet valve piston 516 and the outlet valve seat 518 and the pressure chamber 532 is fluid communication with the second end 406. Therefore, when the outlet valve piston 516 is in the open position, an outlet fluid path between the central chamber 414 passes through the pressure chamber 532.

The outlet valve 502 includes an outlet valve actuator 520 that responds to instructions from the control unit 100. Instructions from the control unit 100 cause the outlet valve piston 516 to actuate between the open position and the closed position.

The outlet valve actuator 520 includes a solenoid 550 that responds to electrical signals from the control unit 100. Based upon the electrical signals received from the control unit 100, the solenoid 550 can activate thereby connecting an air compressor 552 to an air line 554. The air line 554 is connected to one end of an outlet pilot valve body 556. The solenoid 550 can also de-activate thereby connecting the air line 554 to a vent port (not shown) of the solenoid valve 550. The outlet pilot valve body 556 includes an outlet pilot valve piston 558, which has one piston face that faces the pressurized air line 554. The pilot valve piston 558 also has an opposite piston face that is connected to an outlet pilot valve stem 560. The outlet pilot valve stem 560 extends away from the outlet pilot valve piston 558. The outlet pilot valve stem 560 extends away from the outlet pilot valve piston 558 through an outlet pilot valve chamber 562. The outlet pilot valve stem 560 can move within the outlet pilot valve chamber 562 without creating any pressure or fluid seals therein.

Three separate channels branch off of the outlet pilot valve chamber 562: a first outlet pilot chamber 568; at second outlet pilot chamber 566; and a third outlet pilot chamber 564.

The first outlet pilot chamber 568 is connected between the pilot valve chamber 562 and the central chamber 414, providing fluid communication therebetween. The second outlet pilot chamber 566 is connected between and the first surface 519 of the outlet valve piston 516. The second outlet pilot chamber 566 can extend through the manifold plate 527. The second outlet pilot chamber 566 establishes fluid communication between the first surface 519 of the outlet valve piston 516 and the outlet pilot valve chamber 562. The third outlet pilot chamber 564 is connected between the second end 406 and the outlet pilot valve chamber 562 to establish fluid communication therebetween.

The pilot valve chamber 562 also includes an outlet pilot ball valve 570, an inlet pilot ball valve seat 572 and an outlet ball valve seat 574. The outlet pilot ball valve 570 can be seated in the inlet pilot ball valve seat 572, referred to as the inlet position. The outlet pilot ball valve 570 can also be seated in the outlet pilot ball valve seat 574, referred to as the outlet position.

When the outlet pilot ball valve 570 is in the inlet position, there is fluid communication between the central chamber 414 and the first surface 519 of the outlet valve piston 516. When the outlet pilot ball valve 570 is in the inlet position, there is no fluid communication between the second pilot chamber 566 and the third outlet pilot chamber 564 and the outlet valve piston 516 is in the closed position.

When the outlet pilot ball valve 570 is in the outlet position, there is no fluid communication between the central chamber 414 and either of the second outlet pilot chamber 566 or the third outlet pilot chamber 564. When the outlet pilot ball valve 570 is in the outlet position fluid communication is established between the second outlet pilot chamber 566 and the third outlet pilot chamber 564. When the outlet pilot ball valve 570 is in the outlet position, the outlet valve piston 516 is in the open position. When the outlet valve piston 516 is in the open position an outlet fluid passage is provided from the central chamber 414 to the second end 406 through the discharge flow port 530 and the pressure chamber 532.

In an additional optional feature of the concentrate valve body 400, the pressure chamber 532 includes a pressure relief system 600. The pressure relief system 600 includes an outlet pressure relief valve 602 and an outlet pressure relief chamber 604. The outlet pressure relief valve 602 is positioned between the pressure chamber 532 and the second end 406, as shown in FIG. 2. The outlet pressure relief chamber 604 provides fluid communication between the pressure chamber 532 and the second end 406. The outlet pressure relief valve 602 can be any type of known pressure relief valve that will actuate when the pressure within the pressure chamber 532 increases beyond a set point, for example 500 to 1000 p.s.i. Actuation of the outlet pressure relief valve 602 will allow fluid communication from the pressure chamber 532 to the second end 406.

In an additional optional feature, the pilot valve bodies 456, 556 includes a spring (not shown) that provides a biasing force to physically direct the pilot valve pistons 458, 558 away from the pilot ball valves 470, 570. The pilot valve stems 460, 560 will similarly move away from the pilot ball valves under this biasing force. The biasing force of this spring is lower than the air pressure delivered by the lines 454, 554, for example 100 p.s.i. so that this spring will only physically move the pilot valve pistons 458, 558 when there is no air pressure delivered to the piston face.

High pressure concentrate may periodically enter the valve body 400 via the inlet 404, this is referred to as the inlet phase. The high pressure concentrate enters the valve body 427 and flows around the manifold plate 427 and enters the high pressure chamber 432. At the onset of the inlet phase, the inlet valve piston 416 is in the closed position and the pilot ball valve 470 is in the outlet position. The flow of high pressure concentrate into the high pressure chamber 432 acts on the outer ring 425 of the inlet valve piston 416. The hydrostatic pressure in the central chamber 414 and the second pilot chamber 466 will equalize due to the movement of the pilot ball valve 470 to the inlet position. Therefore the hydrostatic pressure acting on the first surface 419 of the inlet valve piston 416 is the same as the hydrostatic pressure within the central chamber 414. At the beginning of the inlet phase, the hydrostatic pressure within the central chamber 414 is lower than the hydrostatic pressure of the high pressure concentrate within the high pressure chamber 432. Therefore, the hydrostatic pressure acting upon the outer ring 425 is greater than the pressure acting on the first surface 419 of the inlet valve piston 416. This pressure differential causes the inlet piston valve 416 to move to the open position.

As the high pressure concentrate flows through the area of inlet valve seat 418, turbulence can occur and cause head loss. Due to this head loss, even when the inlet valve piston 416 is in the open position, the hydrostatic pressure within the central chamber 414 is less than the hydrostatic pressure within the high pressure chamber 432. The outer ring 425 is positioned upstream of at least a portion of the head loss, due to being recessed from the central area 423. Therefore, the pressure acting upon the outer ring 425 remains greater than the pressure within the central chamber 414. Further, the hydrostatic pressure acting upon the outer ring is greater than the physical biasing force of the inlet spring 429. The flow of high pressure concentrate from the high pressure chamber 432 into the central chamber 414 allows the inlet valve piston 416 to remain in the open position.

During the inlet phase the control unit 100 sends electrical signals to the electronically controlled actuators 420, 520 of the concentrate valve bodies 400, 401. As described above, both of the inlet actuator 420 and the outlet actuator 520 are responsive to electrical signals, for example a change in voltage, current and the like, from the electronic controller unit 100. In response to instructions from the control unit 100, the concentrate valve body 400 actuates, for example the position of the pilot ball valve 470 and the outlet pilot ball valve 570 can change from the outlet position to the inlet position.

During the inlet phase the control unit 100 sends electric signals to the inlet valve actuator 420. The inlet valve actuator 420 actuates the solenoid 450 to cause the inlet air compressor 452 to act on the pilot valve piston 458. The air pressure on the pilot valve piston 458 causes the pilot valve stem 460 to direct the pilot ball valve 470 into the inlet position.

The hydrostatic force of the high pressure concentrate within the second pilot chamber 466 and the physical biasing force of the inlet spring 429 both act upon the first surface 419 of the inlet valve piston 416. When the pilot ball valve 470 is in the inlet position, the second pilot chamber 466 is in fluid communication with the pilot valve chamber 466 and the third pilot chamber 468. This fluid communication allows any concentrate fluids within the second pilot chamber 466 to flow into the central chamber 414.

The movement of the pilot ball valve 470 equilibrates the hydrostatic forces acting on the first surface 419 with the static pressure within the central chamber 414.

During the inlet phase, the outlet valve piston 516 is in the closed position which directs the high pressure concentrate entering the central chamber 414 to enter the concentrate access port 242.

During the inlet phase, the high pressure concentrate will flow through the central chamber 414 to enter the first outlet pilot chamber 568 and the outlet pilot valve chamber 542 and direct the outlet ball valve 570 to sit in the inlet pilot ball valve seat 572, the inlet position. During the inlet phase, the control unit 100 decreases the pressure acting upon the outlet pilot valve piston 558. Therefore, the outlet pilot valve stem 560 does not act upon the outlet pilot ball valve 570, against the high pressure concentrate within the outlet pilot valve chamber 542.

When the outlet ball valve 570 is in the inlet position, there is fluid communication between the third pilot chamber 568 and the second outlet pilot chamber 566 so that the high pressure concentrate flows from the central chamber 414 into the second outlet pilot chamber 566 to act upon the first surface 519 of the outlet valve piston 516. During the inlet phase, the high pressure concentrate also flows around the manifold plate 527, through the flow port 530 and into the pressure chamber 532. The combined pressure of the high pressure concentrate on the first surface 519 and the outlet spring 529 is greater than the force of the high pressure concentrated upon the outer ring 525 and the outlet valve piston 516 is in the closed position. As described above, if the outlet valve piston 516 is in the closed position, then there is no fluid communication provided between the pressure chamber 532 and the outlet end of the concentrate valve body 400.

Periodically, the valve body 400 can experience an outlet phase. During the outlet phase there is little to no flow of high pressure concentrate entering the valve body 400 at the inlet 404. Further, there is a flow of fluid from the port 242 into the central chamber 414. The little or no flow of high pressure concentrate within the high pressure chamber 432 allows the inlet valve piston 416 to move to the closed position.

During the outlet phase, the outlet valve piston 516 can open in a manner similar to the inlet valve piston 416 during the inlet phase. The flow of concentrate from the central chamber into the pressure chamber 532 will act upon the outer ring of the outlet valve piston 516. This flow of concentrate has a higher hydrostatic pressure than the pressure within the outlet at the second end 406 and the hydrostatic pressure action upon the first surface 519. Therefore, the outlet valve piston 516 moves to the open position. Similarly, the flow of concentrate through the area of the outlet valve seat 518 will experience a head loss. The positioning of the outer ring 525 upstream of at least a substantial portion of the head loss allows the outlet valve piston to remain open during constant flow of concentrate from the central chamber 414 to the outlet at the second end 406.

During the outlet phase, the control unit 100 can send electric signals to allow the discharge or outlet of the concentrate from the central chamber 414.

Under instruction from the control unit 100, the air compressor 452 does not provide any air pressure through line 454 to act upon the inlet pilot valve piston 458 and the pilot ball valve 470 is directed to the outlet position. When the pilot ball valve 470 is in the outlet position, there is fluid communication between the first pilot chamber 464 and the second pilot chamber 466. When the inlet valve piston 416 is in the closed position there is no fluid communication between the high pressure chamber 432 and the central chamber 414 and there is no flow of high pressure concentrate from the inlet end 404 into the central chamber 414.

During the outlet phase, the control unit 100 causes the outlet actuator 520 to provide pressure to the face of the outlet pilot valve piston 558, which causes the outlet pilot valve stem 560 to physically direct the outlet pilot ball valve 570 into the outlet pilot valve seat 574, the outlet position. The physical force of the outlet pilot valve stem 560 directing the outlet pilot ball valve 570 into the outlet position is greater than the hydrostatic pressure of the concentrate as it exits the port 242 and acts upon the outlet pilot ball valve 570 via the third pilot chamber 564. While the outlet pilot ball valve 570 is in the outlet position, the second outlet pilot chamber 566 is in fluid communication with the third outlet pilot chamber 564. The hydrostatic pressure of the concentrate within the pressure chamber 532 acting upon the outer ring 525 of the outlet valve piston 516 is greater than the total amount of force acting on the first surface 519, the outlet valve piston 516 is displaced from the outlet valve seat 518 and the concentrate exiting the concentrate working chamber of the water cylinder 200 flows from the central chamber 414 to the outlet end 406 of the concentrate valve body 400.

This written description uses examples to disclose the invention, including the best mode, to enable any person skilled in the art to practice the invention, including making and using any devices or systems and performing any incorporated methods. The patentable scope of the invention is defined by the claims, and may include other examples that occur to those skilled in the art.

What is claimed is:

1. A valve comprising:
    a) a valve body comprising an inlet and an outlet, a central chamber between the inlet and the outlet, and a port in fluid communication with the central chamber of the valve body to allow fluids to enter and leave the valve body through the port;
    b) a paired inlet piston and inlet piston seat configured to selectively open and close the inlet, the inlet being closed when the front of the inlet piston moves towards the outlet to contact the inlet piston seat;
    c) an inlet plenum in communication with the back of the inlet piston;
    d) an inlet pilot valve;
    e) a conduit A connecting the inlet to the inlet pilot valve;
    f) a conduit B connecting the inlet plenum to the inlet pilot valve;
    g) a conduit C connecting the valve body downstream of the inlet piston seat to the inlet pilot valve,
    wherein the inlet pilot valve is configured to selectively connect conduit A with conduit B or conduit B with conduit C,
    h) a paired outlet piston and outlet piston seat configured to selectively open and close the inlet, the outlet being closed when the front of the outlet piston moves towards the outlet to contact the outlet piston seat;
    i) an outlet plenum in communication with the back of the outlet piston;
    j) an outlet pilot valve;
    k) a conduit D connecting the port to the outlet pilot valve;
    l) a conduit E connecting the outlet plenum to the outlet pilot valve; and,
    m) a conduit F connecting the outlet to the outlet pilot valve,
    wherein the outlet pilot valve is configured to selectively connect conduit D with conduit E or conduit E with conduit F.
2. The valve of claim 1 wherein the inlet piston is biased towards the outlet.
3. The valve of claim 1 wherein the front of the inlet piston comprises a central region and a recessed outer ring.
4. The valve of claim 3 wherein only the central region contacts the inlet piston seat when the inlet is closed.

* * * * *